United States Patent [19]

Ohsato et al.

[11] Patent Number: 5,090,004
[45] Date of Patent: Feb. 18, 1992

[54] TRACKING SYSTEM FOR OPTICAL RECORDING AND/OR REPRODUCING APPARATUS EMPLOYING A MAIN LIGHT BEAM AND A PLURALITY OF AUXILIARY LIGHT BEAMS

[75] Inventors: Kiyoshi Ohsato, Chiba; Atsushi Fukumoto, Kanagawa, both of Japan

[73] Assignee: Sony Corporation, Tokyo, Japan

[21] Appl. No.: 549,826

[22] Filed: Jul. 9, 1990

[30] Foreign Application Priority Data

Jul. 21, 1989 [JP] Japan ................... 1-189272

[51] Int. Cl.$^5$ ........................................... G11B 7/00
[52] U.S. Cl. .......................... 369/44.37; 369/44.26; 369/44.41
[58] Field of Search ............ 369/44.37–44.42, 369/112, 109, 44.12, 13; 250/201.5; 360/114; 350/162.2, 162.17, 162.11

[56] References Cited

U.S. PATENT DOCUMENTS

| | | | |
|---|---|---|---|
| 4,504,938 | 3/1985 | Tajima | 369/44.41 |
| 4,532,522 | 7/1985 | Tsunoda et al. | 369/44.38 |
| 4,592,038 | 5/1986 | Kubota et al. | 369/112 |
| 4,607,359 | 8/1986 | Matsubayashi et al. | 369/44.38 |
| 4,750,162 | 6/1988 | Tajima | 369/44.41 |
| 4,787,075 | 11/1988 | Matsuoka et al. | 369/46.38 |
| 4,831,609 | 5/1989 | Suzuki | 369/44.37 |
| 4,935,913 | 6/1990 | Shinoda | 369/109 |
| 4,993,011 | 2/1991 | Torazawa et al. | 369/44.37 |

FOREIGN PATENT DOCUMENTS 0237940 9/1989 Japan ..................... 369/109

Primary Examiner—Roy N. Envall, Jr.
Assistant Examiner—Thang V. Tran
Attorney, Agent, or Firm—Alvin Sinderbrand; William S. Frommer

[57] ABSTRACT

In an optical recording and/or reproducing apparatus a main light beam and at least two auxiliary light beams are caused to impinge upon a disc for recording information thereon or reproducing information therefrom in a manner so that light beam spots formed on the disc by two auxiliary light beams are respectively equidistant from a light beam spot formed on the disc by the main light beam with a space between the auxiliary light beam spots in a radial direction of the disc corresponding to N/2 times a track pitch on the disc and the aforementioned light beams are then guided from the disc to a photosensor comprising a first photodetecting element divided into two parts for detecting the main light beam and a second photodetecting element divided into two parts for detecting both auxiliary light beams. A tracking error signal is produced based on a difference between detection outputs derived respectively from two parts of the first photodetecting element and a difference between detection outputs derived respectively from two parts of the second photodetecting element, one of which is subjected to level adjustment for compensating a difference in intensity between the main light beam and each of the auxiliary light beams.

6 Claims, 4 Drawing Sheets

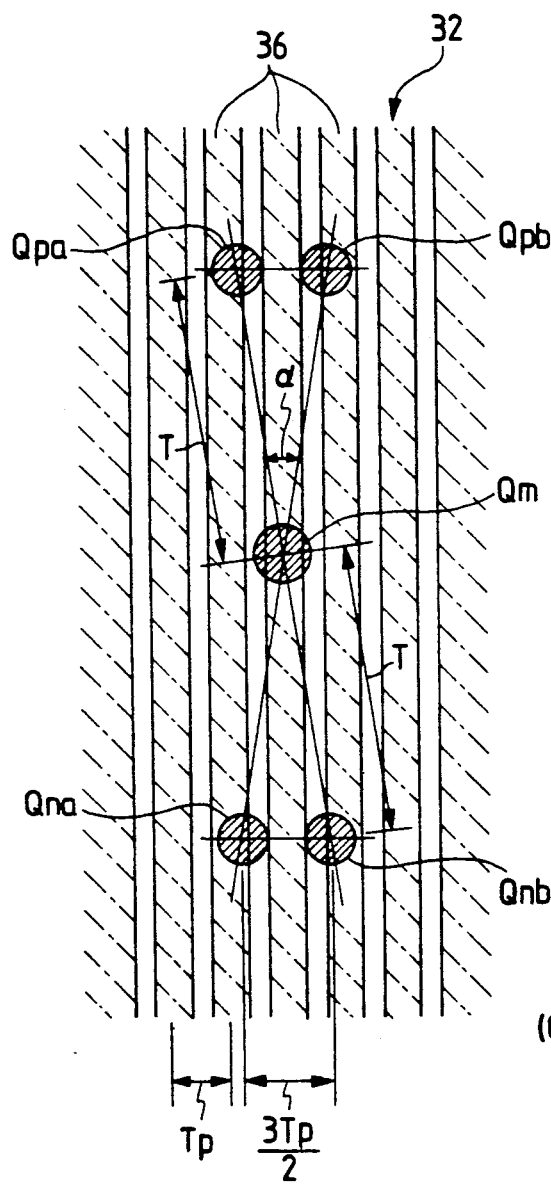
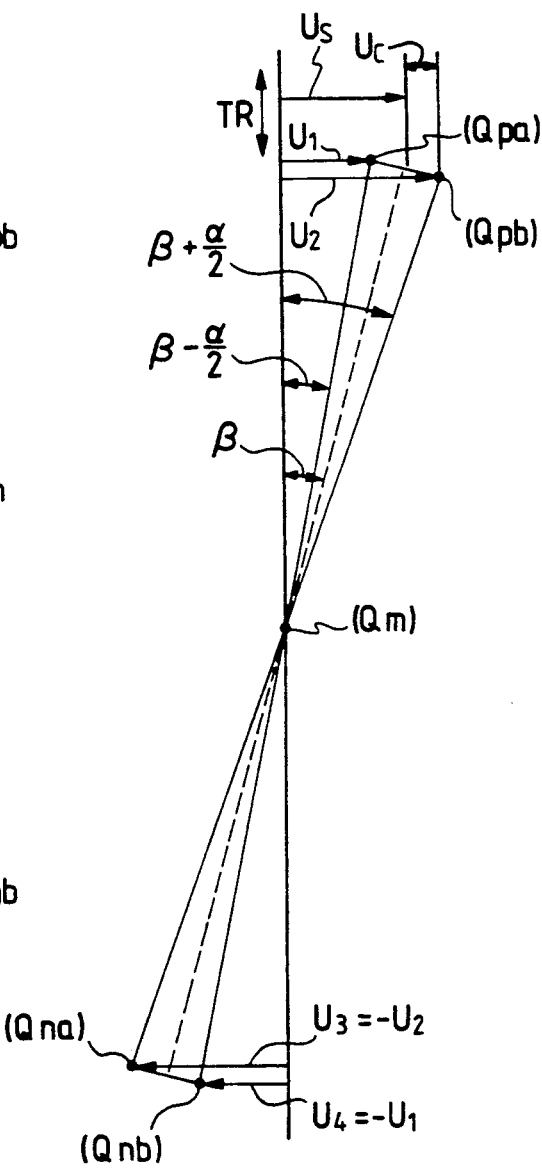
FIG. 4
FIG. 6

TRACKING SYSTEM FOR OPTICAL RECORDING AND/OR REPRODUCING APPARATUS EMPLOYING A MAIN LIGHT BEAM AND A PLURALITY OF AUXILIARY LIGHT BEAMS

BACKGROUND OF THE INVENTION

1. Field of the Invention

The present invention relates generally to optical recording and/or reproducing apparatus, and more particularly, is directed to improvements in an apparatus operative to cause a main light beam and at least two auxiliary light beams to impinge upon a disc-shaped record medium for recording information thereon or reproducing information therefrom.

2. Description of the Prior Art

In an optical disc player for optically recording an information signal on or optically reproducing an information signal from an optical disc-shaped record medium having a center hole and a recording area on which a spiral record track is composed to surround the center hole, an optical head device is provided which comprises an optical arrangement for causing a light beam to impinge upon the recording area of the optical disc-shaped record medium rotating with a rotation center disposed at the center hole so as to form the spiral record track corresponding to a recording information signal on the recording area or to read an information signal recorded in the spiral record track on the recording area.

In the optical head device, for example, a laser light beam produced by a light beam generating portion is collimated by a collimator lens and enters into an objective lens to be focused thereby to impinge upon the optical disc-shaped record medium. Then, a reflected light beam emanating from the optical disc-shaped record medium is directed through the objective lens to a beam splitter to be changed in the direction of its optical axis thereby so as to enter into a photodetecting portion. A reproduced information signal, a focus error signal and a tracking error signal are produced based on a detection output of the reflected light beam from the photodetecting portion. A focus servocontrol operation for maintaining correct focus of the light beam projected onto the optical disc-shaped record medium and a tracking servocontrol operation for maintaining the light beam in correct tracking relation to each turn of the spiral record track on the optical disc-shaped record medium are performed in accordance with the focus error signal and the tracking error signal, respectively.

For, the production of the tracking error signal, various signal producing systems including the so-called "Push-Pull system" have conventionally been used. In the so-called "Push-Pull system", the reflected light beam emanating from the optical disc-shaped record medium is detected by a photosensor having a photodetecting element divided into two parts. The tracking error signal is produced based on a difference in level between detection outputs obtained from two parts of the photodetecting elements, respectively. In the case where the tracking error signal is produced in accordance with the so-called "Push-Pull system", although an optical arrangement for obtaining the tracking error signal and a signal processing circuit arrangement accompanying with the optical arrangement can be construed to be relatively simple, there is a disadvantage. That is, a light spot formed on the photosensor by the reflected light beam from the optical disc-shaped record medium is undesirably moved, regardless of the tracking condition of the light beam impinging upon the optical disc-shaped record medium and therefore the tracking error signal comes to contain undesirable DC offsets when the optical disc-shaped record medium is inclined in its radial direction to the optical axis of the objective lens through which the light beam is incident upon the optical disc-shaped record medium.

Accordingly, with the intention of avoiding the above mentioned disadvantage encountered with the so-called "Push-Pull system", an improved Push-Pull system has been proposed, as disclosed in the Japanese Patent application published as Laid-Open number 61-94246. In the case where the tracking error signal is produced in accordance with the improved Push-Pull system, at least two light beams which are obtained by dividing a light beam produced by a light beam source are caused to impinge upon an optical disc-shaped record medium for forming respective light beam spots on the same with a space therebetween in the radial direction of the optical disc-shaped record medium, which corresponds to a distance in a predetermined relation to the track pitch of the spiral record track. Then, each of two reflected light beams emanating from the optical disc-shaped record medium is detected by a photosensor having a photodetecting element divided into two parts. A difference in level between detection outputs obtained respectively from two parts of the photodetecting element of the photosensor which detects one of two reflected light beams is subjected to level adjustment for compensating a difference in strength between the two reflected light beams. The aforementioned difference is and then subtracted from a difference in level between detection outputs obtained respectively from two parts of the photodetecting element of the photosensor which detects the other of the reflected light beams to produce thereby the tracking error signal.

The tracking error signal thus obtained is prevented from containing DC offsets so as to represent properly the tracking condition of the light beam impinging upon the optical disc-shaped record medium, even if the optical disc-shaped record medium is inclined in its radial direction to the optical axis of the objective lens through which the light beam is incident upon the optical disc-shaped record medium.

When a light beam from an optical head device is caused to impinge upon an optical disc-shaped record medium which is rotating to form thereon a spiral record track corresponding to a recording information signal or to read an information signal recorded in a spiral record track formed thereon in an optical disc player, it is required for the light spot formed by the beam impinging upon the optical disc-shaped record medium to move relative to the optical disc-shaped record medium in a direction from the outermost fringe portion of the optical disc-shaped record medium to the innermost fringe portion of the optical disc-shaped record medium, or vice versa. Accordingly, it is the usual practice that the optical head device is moved in the direction from the outermost fringe portion of the optical disc-shaped record medium to the inner most fringe portion of the optical disc-shaped record medium, or versa. Consequently various head driving mechanisms for moving the optical head device in the direction from the outermost fringe portion of the optical disc-shaped record medium to the inner most fringe portion of the optical disc-shaped record medium, or vice versa, have been proposed.

One head driving mechanism that has been proposed is of a swing arm type in which a swing arm pivoted at one end is provided for supporting the optical head device attached to the other end thereof. The optical head device is moved in the direction from the outermost fringe portion of the optical disc-shaped record medium to the inner most fringe portion of the optical disc-shaped record medium, or vice versa when the swing arm is rotated on its pivoted end. Such a head driving mechanism of swing arm type can have a relatively simple construction and is advantageous in view of utilizing space 7 efficiently in the optical disc player.

However, in the event the optical disc player employs the head driving mechanism of swing arm type, a moving locus of the optical head device is along an arc of a circle with a center disposed at a position of the pivoted end of the swing arm. Therefore, the moving locus does not extend along the radial direction of the optical disc-shaped record medium. Consequently, when a plurality of light beams are incident upon the optical disc-shaped record medium to form respective light beam spots aligned thereon, a direction of the alignment of the light beam spots on the optical disc-shaped record medium is varied to a direction tangential to the spiral record track with the movement of the optical head device on the optical disc-shaped record medium.

As a result, in the case where the tracking error signal is produced in accordance with the improved Push-Pull system as described above in the optical disc player employing the head driving mechanism of swing arm type, the direction of the alignment of two light beam spots, which are formed on the optical disc-shaped record medium to be used for producing the tracking error signal, is varied to the direction tangential to the spiral record track with the movement of the optical head device on the optical disc-shaped record medium. The result is that the tracking error signal has level variations, irrespective of the tracking condition of the light beam impinging upon the optical disc-shaped record medium, in such a large scale as to interfere with the tracking servocontrol operation being carried out correctly.

OBJECTS AND SUMMARY OF THE INVENTION

Accordingly, it is an object of the present invention to provide an optical recording and/or reproducing apparatus in which a plurality of light beams, including a main light beam and at least two auxiliary light beams, are caused by an optical head device to impinge upon a disk-shaped record medium for recording information thereon or reproducing information therefrom, and a tracking error signal is produced in accordance with the improved Push-Pull system, and which avoids the aforementioned problems and disadvantages encountered with the prior art.

Another object of the present invention is to provide an optical recording and/or reproducing apparatus in which a plurality of light beams, including a main light beam and at least two auxiliary light beams, are caused by an optical head device to impinge upon a disk-shaped record medium for recording information thereon or reproducing information therefrom, and a tracking error signal is produced in accordance with the improved Push-Pull system, and further in which the tracking error signal is effectively suppressed in its level variations irrespective of the tracking condition of the main light beam on the optical disc-shaped record medium when a direction of the alignment of light beam spots formed by the main light beam and at least two auxiliary light beams on the optical disc-shaped record medium is varied to a direction tangential to a spiral record track with the movement of the optical head device on the optical disc-shaped record medium.

According to the present invention, there is provided an optical recording and/or reproducing apparatus comprising a light beam generator for producing a main light beam and at least two auxiliary light beams, a photosensing device having a first photodetecting element divided into two parts and a second photodetecting element divided into two parts, and an optical path forming device for causing the main light beam and two auxiliary light beams to impinge upon an optical disc-shaped record medium and for guiding the main light beam emanating from the optical disc-shaped record medium to the first photodetecting element and both of two auxiliary light beams emanating from the optical disc-shaped record medium to the second photodetecting element. The optical path forming device is arranged to position the main light beam and two auxiliary light beams in such a manner that light beam spots formed on the optical disc-shaped record medium by the two auxiliary light beams are respectively equidistant from a light beam spot formed on the optical disc-shaped record medium by the main light beam. The light beam spots formed by the two auxiliary light beams are spaced apart in a radial direction of the optical disc-shaped record medium, of a distance which corresponds to N/2 (N is a positive integer) times a track pitch on the optical disc-shaped record medium. The present invention further provides for a signal generating circuit block operative to obtain a first difference output corresponding to a difference in level between detection outputs derived respectively from two parts of the first photodetecting element of the photosensing device, and a second difference output corresponding to a difference in level between detection outputs derived respectively from two parts of the second photodetecting element of the photosensing device. The signal generating circuit block produces a tracking error signal based on a difference in level between the first and second difference outputs, where one of the first and second difference outputs is subjected to level adjustment for compensating a difference in intensity between the main light beam and each of two auxiliary light beams.

In the optical recording and/or reproducing apparatus thus constituted in accordance with the present invention, the main light beam is controlled to form the light beam spot thereof on the record track provided on the optical disc-shaped record medium, and two auxiliary light beams are controlled to form the respective light beam spots on the optical disc-shaped record medium so that the latter are respectively equidistant from the light beam spot formed by the main light beam. The light beam spots formed by the two auxiliary light beams are spaced apart in the radial direction of the optical disc-shaped record medium, which corresponds to N/2 times a track pitch on the optical disc-shaped record means. The main light beam and both of two auxiliary light beams emanating from the optical disc-shaped record medium are detected by the first photodetecting elements which are divided into two parts and the second photodetecting elements which are divided into two parts, respectively.

Then, the first difference output corresponding to the difference in level between the detection outputs obtained from two parts of the first photodetecting element of the photosensing device, which are operative to detect the main light beam from the optical disc-shaped record medium, and the second difference output corresponding to the difference in level between the detection outputs obtained from two parts of the second photodetecting element of the photosensing device, which are operative to detect both of two auxiliary light beams from the optical disc-shaped record medium, are prepared. The tracking error signal is produced based on the difference in level between the first and second difference outputs, where one of the first and second difference outputs is subjected to level adjustment for compensating the difference in intensity between the main light beam and each of two auxiliary light beams.

As mentioned above, the second difference output is obtained based on the detection outputs obtained respectively from two parts of the second photodetecting, element of the photosensing device. These aforementioned parts detect both of two auxiliary light beams which form respective light beam spots disposed on the optical disc-shaped record medium to be respectively equidistant from the light beam spot formed on the optical disc-shaped record medium by the main light beam. The light beam spots formed by the two auxiliary light beams are spaced apart in the radial direction of the optical disc-shaped record medium, which corresponds to N/2 times the track pitch on the optical disc-shaped record medium. Therefore, the second difference output does not substantially contain components corresponding to movements of each of two auxiliary light beams to the record track, which cancel each other, but contains only a DC offset component. Then, the second difference output containing only the DC offset component is subtracted from the first difference output to produce the tracking error signal. Consequently, in the case where an aligning direction of the light beam spots, which are formed by the main light beam and the two auxiliary light beams on the optical disc-shaped record medium, is varied to a tangential direction of the record track with the movement of the optical head device on the optical disc-shaped record medium, the displacements of each of the two auxiliary light beams to the record track caused by the variations in the aligning direction of the aforementioned light beam spots are prevented from exerting a negative influence upon the tracking error signal. Therefore the tracking error signal is effectively suppressed in its level variations irrespective of the tracking condition of the main light beam on the optical disc-shaped record medium.

The above and other objects, features and advantages of the present invention will become apparent from the following detailed description which is to be read in conjunction with the accompanying drawings.

BRIEF DESCRIPTION OF THE DRAWINGS

FIG. 4 is a schematic illustration of light beam spots formed on an optical disc by main and auxiliary light beams in the embodiment of FIG. 1;

FIG. 6 is a schematic illustration to which reference will be made in explaining the operation of the embodiment shown in FIG. 1.

DESCRIPTION OF A PREFERRED EMBODIMENT

Figure 1:
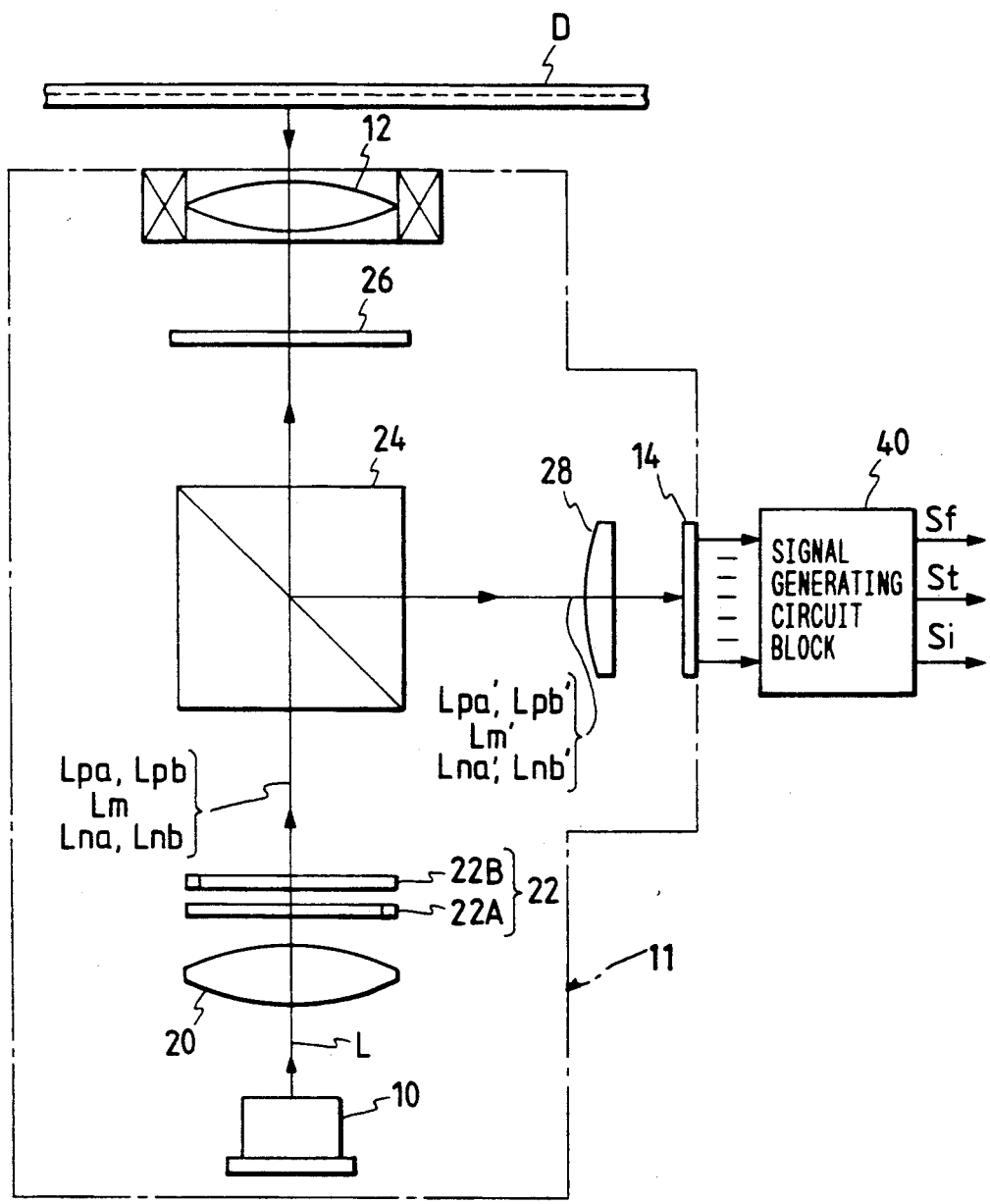
FIG. 1 is a schematic illustration showing an essential part of one embodiment of optical recording and/or reproducing apparatus according to the present invention.

As shown schematically on FIG. 1, an optical recording and/or reproducing apparatus according to an embodiment of the present invention may be in the form of an optical disc player which generally comprises an optical unit 11 and a signal generating circuit block 40. In the illustrated optical disc player, the optical unit 11 is shown to include a semiconductor laser device 10 for generating a laser light beam L, an objective lens 12 and a photosensor 14 and is suitably mounted to move in a radial direction relative to a disc D, which is an optical disc-shaped record medium.

Figure 2:
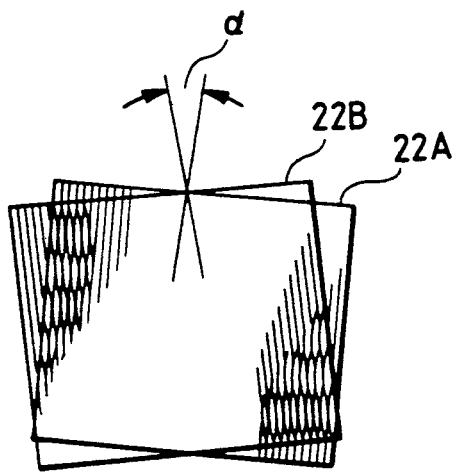
FIG. 2 is a schematic illustration showing an example of a grating portion employed in the embodiment shown in FIG. 1.

The laser light beam L generated by the semiconductor laser device 10 is collimated by a collimator lens 20 and then enters into a grating arrangement 22. The grating arrangement 22 includes a pair of grating members 22A and 22B superposed on each other. The grating directions of the grating members 22A and 22B intersect each other at a predetermined angle $\alpha$, as shown in FIG. 2.

In the grating arrangement 22 comprised of the grating members 22A and 22B superposed on each other, the laser light beam L is divided into a center beam and first and second side beams which are positioned at opposite sides of the center beam. Each of the first and second side beams is further divided into two beams with a relatively small space therebetween corresponding to the predetermined angle $\alpha$. Therefore, five beams, including the center beam, a pair of divided first side beams with the relatively small space therebetween, and a pair of divided second side beams with the relatively small space therebetween are obtained from the grating arrangement 22. The side beam serves as main light beam Lm, the divided first side beams serve as auxiliary light beams Lpa and Lpb, respectively, and the divided second side beams serve as auxiliary light beams Lna and Lnb, respectively. For the sake of simplicity, these main and auxiliary light beams Lm, Lpa, Lpb, Lna and Lnb are represented by a single line in FIG. 1. Each of the main light beam Lm and the auxiliary light beams Lpa, Lpb, Lna and Lnb obtained from the grating arrangement 22 passes through a polarized beam splitter 24 without changing the direction of its optical axis. Then, each of the light beams Lm, Lpa, Lpb, Lna and Lnb passes through a ¼-wave plate 26 to the objective lens 12 and is focused by the objective lens 12 to impinge upon the disc D.

Figure 3:
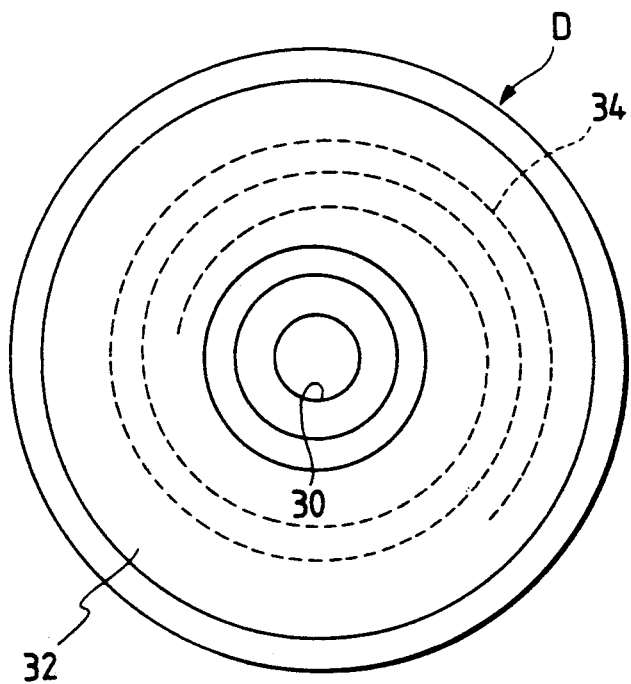
FIG. 3 is a schematic plan view showing an example of an optical disc used in the embodiment shown in FIG. 1.

As shown in FIG. 3, the disc D is provided with a center hole 30 and an information recording area 32 concentrically disposed around the center hole 30. On the information recording area 32, a spiral guide groove 34 is previously formed around the center hole 30, and a spiral record track is to be formed along this spiral guide groove 34. The spiral record track is to have a track pitch (a distance between centers of two adjacent turns of the, spiral record track) of, for example, about 1.6 μm and, for the sake of simplicity, each turn of the spiral record track is hereinafter referred to as a track.

The main light beam Lm and the auxiliary light beams Lpa, Lpb, Lna and Lnb incident upon the disc D are modulated in intensity by either the spiral guide groove 34 or the spiral record track and are then reflected to constitute a reflected main light beam Lm' and reflected auxiliary light beams Lpa', Lpb', Lna' and Lnb', respectively. The reflected main light beam Lm' and reflected auxiliary light beams Lpa', Lpb', Lna' and Lnb', as reflected from the disc D, pass through the objective lens 12 and the ¼-wave plate 26 to the polarized beam splitter 24. Then, each of the reflected main light beam Lm' and reflected auxiliary light beams Lpa', Lpb', Lna' and Lnb' is deflected at the polarized beam splitter 24 so as to pass to the photosensor 14 through a receiving lens 28.

The objective lens 12, the polarized beam splitter 24, the ¼-wave plate 26 and the receiving lens 28 constitute an optical path forming device which is operative to cause the main light beam Lm and the auxiliary light beams Lpa, Lpb, Lna and Lnb obtained from the grating arrangement 22 to impinge upon the disc D, and further operative to guide the reflected main light beam Lm' and reflected auxiliary light beams Lpa', Lpb', Lna' and Lnb' emanating from the disc D to the photosensor 14. The optical path forming device is adjusted to position the main light beam Lm and the auxiliary light beams Lpa, Lpb, Lna and Lnb, each focused by the objective lens 12, to impinge upon an information recording area of the disc D, as shown in FIG. 4. In the information recording area of the disc D, a main light beam spot Qm is formed by the main light beam Lm on a spiral record track 36. A group of auxiliary light beam spots Qpa and Qpb and another group of auxiliary light beam spots Qna and Qnb are formed by the pair of auxiliary light beams Lpa and Lpb and the pair of auxiliary light beams Lna and Lnb, respectively, with the main light beam spot Qm disposed therebetween. The auxiliary light beam spots Qpa, Qpb, Qna and Qnb are respectively equidistant, for example, a distance T, from the main light beam spot Qm. Thus, the main light beam spot Qm and the auxiliary light beam spots Qpa and Qpb are positioned respectively at apexes of an equilateral triangle with an apex angle of α between the equilateral sides and the main light beam spot Qm, and the auxiliary light beam spots Qna and Qnb are positioned respectively at apexes of another equilateral triangle with an apex angle of α between the equilateral sides. The auxiliary light beam spots Qpa and Qpb have a space therebetween in the radial direction of the disc D, which corresponds to N/2 times a track pitch Tp of the spiral record track 36 on the disc D, for example, 3Tp/2, and the auxiliary light beam spots Qna and Qnb similarly have a space therebetween in the radial direction of the disc D, which corresponds to N/2 times the track pitch Tp, for example, 3Tp/2.

Figure 5:
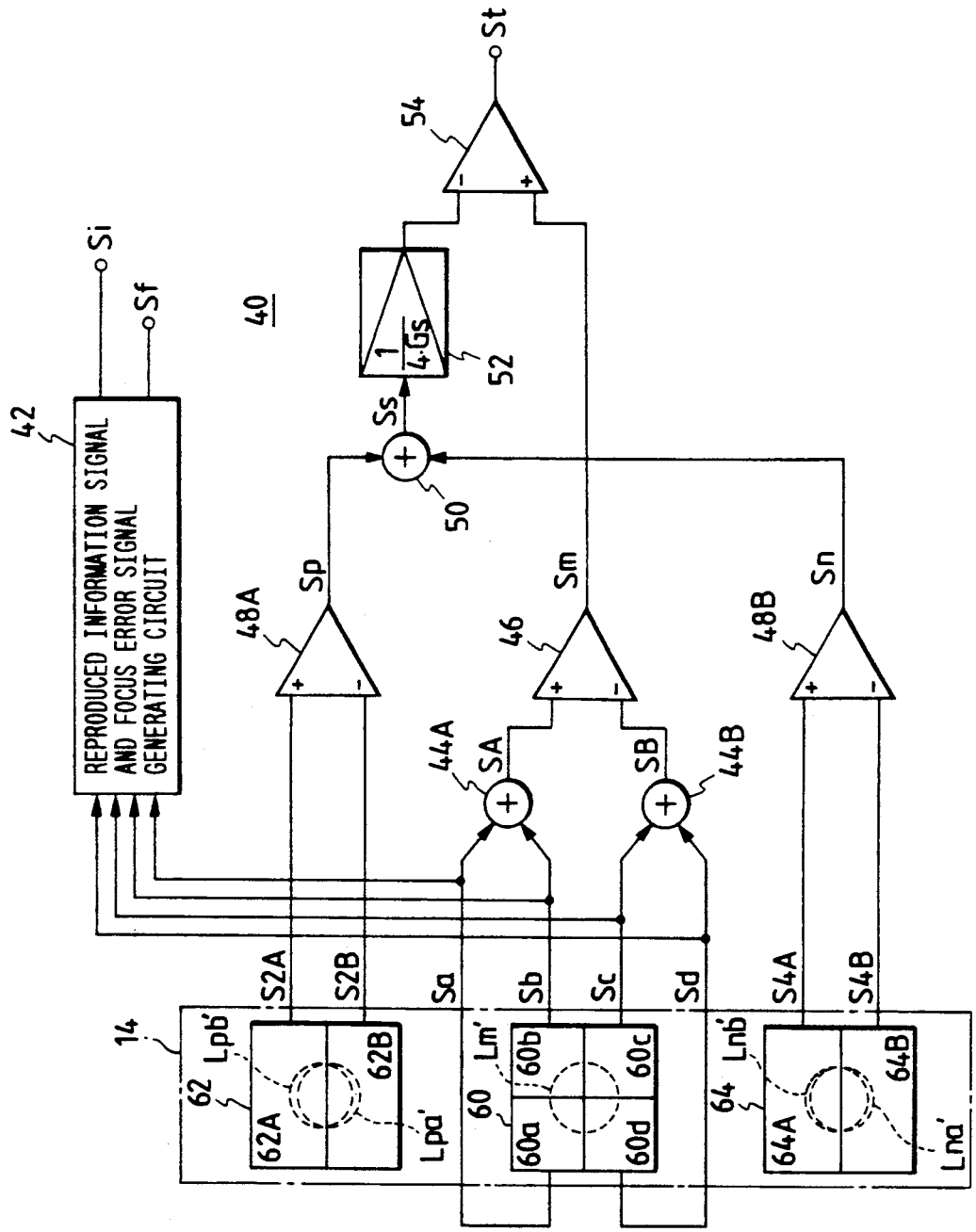
FIG. 5 is a schematic circuit diagram showing an example of a signal generating circuit employed in the embodiment shown in FIG. 1.

The photosensor 14 upon which the reflected main light beam Lm' and the reflected auxiliary light beams Lpa, Lpn, Lna and Lnb are incident is shown on FIG. 5 to be provided with a first photodetecting element 60 for detecting the reflected main light beam Lm', a second photodetecting element 62 for detecting both of the reflected auxiliary light beams Lpa' and Lpb', and a third photodetecting element 64 for detecting both of the reflected auxiliary light beams Lna' and Lnb'. Detection output signals obtained from the first, second and third photodetecting elements of the photosensor 14 are supplied to a signal generating circuit block 40 to produce a reproduced information signal Si, a focus error signal Sf and a tracking error signal St.

As shown more specifically on FIG. 5, the photodetecting element 60 for detecting the reflected main light beam Lm' is divided into four parts 60a, 60b, 60c and 60d disposed close to one another. The photodetecting element 62 for detecting both of the reflected auxiliary light beams Lpa' and Lpb' as the second photodetecting element, which is divided into two parts 62A and 62B disposed close to each other, and the photodetecting element 64 for detecting both of the reflected auxiliary light beams Lna' and Lnb' is divided into two parts 64A and 64B disposed close to each other.

Detection output signals Sa, Sb, Sc and Sd obtained from the parts 60a, 60b, 60c and 60d of the photodetecting element 60, respectively, are supplied to a reproduced information signal and focus error signal generating circuit 42 constituting a part of the signal generating circuit block 40. In the reproduced information signal and focus error signal generating circuit 42, the reproduced information signal Si and the focus error signal Sf are separately produced based on the detection output signals Sa, Sb, Sc and Sd delivered thereto.

Further, in the signal generating circuit block 40, the detection output signals Sa and Sb are added to each other in an adder 44A to produce an added signal SA (=Sa+Sb), and the detection output signals Sc and Sd are also added to each other in an adder 44B to produce an added signal SB (=Sc+Sd). The added signals SA and SB are substantially equivalent to detection output signals obtained from first and second detecting parts, respectively, in which such first detecting part corresponds to the parts 60a and 60b of the photodectecting element 60 in combination with each other and the second detecting part which corresponds to the parts 60c and 60d in combination with each other.

The added signals SA and SB are supplied to a subtracter 46 to produce a difference signal Sm (=SA−SB) which corresponds to a level difference between the added signals SA and SB.

Detection output signals S2A and S2B obtained from the parts 62A and 62B of the photodetecting element 62, respectively, are supplied to a subtracter 48A to produce a difference signal Sp (=S2A−S2B), which corresponds to a level difference between the detection output signals S2A and S2B. Detection output signals S4A and S4B obtained from the parts 64A and 64B of the photodetecting element 64, respectively, are supplied to a subtracter 48B to produce a difference signal Sn (=S4A−S4B), which corresponds to a level difference between the detection output signals S4A and S4B. The difference signals Sp and Sn are supplied to an adder 50 to produce an added signal Ss (=Sp+Sn).

The difference signal Sm is directly supplied from the subtracter 46 to one of the input terminals of a subtracter 54. The added signal Ss is supplied to a level controller 52 to be subjected therein to level adjustment with a gain of 1/(4·Gs), and is then supplied to the other input terminal of the subtracter 54. The gain 1/(4·Gs) in the level controller 52 is set in response to a ratio in intensity Gs of each of the auxiliary light beams Lpa, Lpb, Lna and Lnb to the main light beam Lm. From the subtracter 54, there is obtained the tracking error signal St as a difference signal (=Sm−Ss/(4·Gs)) which corresponds to a level difference between the difference signal Sm from the subtracter 46 and the added signal Ss after having been adjusted, in level with the gain of 1/(4·Gs) from the level controller 52.

In the case where the tracking error signal St is determined in the above-described manner and the main light beam spot Qm and the auxiliary light beam spots Qpa, Qpb, Qna and Qnb on the information recording area 32 of the disc D, are changed from one disposition, in which a line passing through a center point between the auxiliary light beam spots Qpa and Qpb, a center of the main light beam spot Qm and a center point between the auxiliary light beam spots Qna and Qnb coincides with a tangential direction TR (FIG. 6) of the spiral record track 36 on the information recording area 32, into another disposition in which, as shown in FIG. 6, a dotted line passing through a center point between the auxiliary light beam spots Qpa and Qpb, the center of the main light beam spot Qm and a center point between the auxiliary light beam spots Qna and Qnb, intersects the tangential direction of the spiral record track 36 on the information recording area 32, at an angle of $\beta$. Thus, an aligning direction of the auxiliary light beam spot Qpa, the main light beam spot Qm and the auxiliary light beam spot Qnb intersects the tangential direction of the spiral record track 36 at an angle of $\beta - \alpha/2$, and an aligning direction of the auxiliary light beam spot Qpb, the main light beam spot Qm and the auxiliary light beam spot Qna intersects the tangential direction of the spiral record track 36 at an angle of $\beta + \alpha/2$.

In such a case, if $I_0$ stands for the intensity of the main light beam Lm, $I_1$ stands for the intensity of each of the auxiliary light beams Lpa, Lpb, Lna and Lnb, U represents the displacement of the main light beam Lm from the center of the spiral record track 36 in the radial direction of the disc D, and Uc, Us, $U_1$, $U_2$, $U_3$ and $U_4$ represent respective distances from the line which extends to pass through the center of the main light beam spot Qm along the tangential direction TR of the spiral record track 36, then the following equations can be satisfied.

$$U_1 = Us - Uc$$
$$U_2 = Us + Uc$$
$$U_3 = -Us - Uc$$
$$U_4 = -Us + Uc$$
$$Us = T \cdot \cos(\alpha/2) \cdot \sin\beta$$
$$Uc = 3Tp/4 \cdot \cos\beta$$
$$Sm = SA - SB$$
$$= I_0\{a \cdot \sin(2\pi \cdot U/Tp) + b\}$$
$$Sp = S2A - S2B$$
$$= I_1[a \cdot \sin\{2\pi(U + U_1)/Tp\} + b] +$$
$$\quad I_1[a \cdot \sin\{2\pi(U + U_2)/Tp\} + b]$$
$$= I_1[a \cdot \sin\{2\pi(U + Us - Uc)/Tp\} + b] +$$
$$\quad I_1[a \cdot \sin\{2\pi(U + Us + Uc)/Tp\} + b]$$
$$Sn = S4A - S4B$$
$$= I_1[a \cdot \sin\{2\pi(U + U_3)/Tp\} + b] +$$
$$\quad I_1[a \cdot \sin\{2\pi(U + U_4)/Tp\} + b]$$
$$= I_1[a \cdot \sin\{2\pi(U - Us - Uc)/Tp\} + b] +$$
$$\quad I_1[a \cdot \sin\{2\pi(U - Us + Uc)/Tp\} + b]$$

where a stands for amplitude and b stands for a DC offset component.

Since the equation : $Gs = I_1/I_0$ is satisfied, the following equations are further satisfied.

$$\begin{aligned} St &= Sm - Ss/(4 \cdot Gs) \\ &= Sm - (SN + SN)/(4 \cdot Gs) \\ &= (1 - Ks \cdot Kc) I_0 \cdot a \cdot \sin(2\pi \cdot U/Tp) \end{aligned}$$
where
$$Ks = \cos(2\pi \cdot Us/Tp)$$
$$Kc = \cos(2\pi \cdot Uc/Tp)$$

Accordingly, the tracking error signal St obtained from the subtracter 54 does not include the DC offset component and is thus prevented from having phase deviations.

The tracking error signal St contains a function of the angle of $\beta$, or $(1 - Ks \cdot Kc)$, and therefore it is theoretically correct that the amplitude of the tracking error signal St varies in response to variations in the angle $\beta$. However, the angle $\beta$ is usually smaller than 16 degrees and the value of $(1 - Ks \cdot Kc)$ is about $1 \pm 0.005$. Consequently, the result is that the value of $(1 - Ks \cdot Kc)$ is negligible in practice, and therefore the tracking error signal St is suppressed in level variations.

In the cases described above, the aligning direction of the auxiliary light beam spot Qpa, the main light beam spot Qm and the auxiliary light beam spot Qnb, and the aligning direction of the auxiliary light beam spot Qpb, the main light beam spot Qm and the auxiliary light beam spot Qna are varied in relation to the tangential direction of the spiral record track 36 in the information recording area 32 of the disc D with the movement of the optical unit relative to the disc D, the displacements of each of the auxiliary light beam spots Qpa, Qpb, Qna and Qnb to the spiral record track 36 caused by the variations in each of the aligning directions as aforementioned are prevented from exerting a negative influence upon the tracking error signal St. Therefore the tracking error signal St is effectively suppressed in its level variations irrespective of the tracking condition of the main light beam Lm in the information recording area 32 of the disc D.

Although the reflected main light beam Lm' and reflected auxiliary light beams Lpa', Lpb', Lna' and Lnb' are used for producing the tracking error signal St in the above described embodiment, it is also possible to have such an arrangement where the reflected main light beam Lm' and either the first group of reflected auxiliary light beams Lpa' and Lpb', or the second group of reflected auxiliary light beams Lna' and Lnb' are used for producing the tracking error signal St. In such a case, in the signal generating circuit block 40, the adder 50 is not provided and either the difference signal Sp obtained from the subtracter 48A or the difference signal Sn obtained from the subtracter 48B, depending upon whether the first or second group is chosen, is subjected to the level adjustment with the gain of 1/(2·Gs) in the level controller 52, and is then supplied to the other input terminal of the subtracter 54.

Further, although the optical unit 11 and the signal generating circuit block 40 of the aforementioned embodiment comprise the information reproducing system applied to, for example, the optical disc player, it is to be understood that the present invention can also be applied to an optical unit and a signal generating circuit block which comprise an information recording system applied to an optical disc player, in which a main light beam and a plurality of auxiliary light beams are caused to impinge upon an optical disc-shaped record medium for recording information signals thereon, and in which, after the aforementioned beams are reflected by the optical disc-shaped record medium, they may be used for producing a focus error signal and a tracking error signal.

What is claimed is:

1. An apparatus for optically recording and/or reproducing information signals on an optical disc-shaped record medium having a spiral record track with a predetermined track pitch between adjacent turns thereof, said apparatus comprising:

light beam generating means for producing a main light beam and at least a pair of auxiliary light beams, photosensing means comprising at least a first photodetecting element divided into at least two parts and a second photodetecting element divided into two parts, optical path forming means for causing said main light beam and said pair of a auxiliary light beams to impinge upon said optical disc-shaped record medium and for guiding said main light beam emanating from said optical disc-shaped record medium to said first photodetecting element and said pair of auxiliary light beams emanating from said optical disc-shaped record medium to said second photodetecting element, said optical path forming means being arranged to position said main light beam and said pair of auxiliary light beams so that light beam spots formed on said optical disc-shaped record medium by said pair of auxiliary light beams are respectively equidistant from a light beam spot formed on said optical disc-shaped record medium by said main light beam, said light beam spots formed by said pair of auxiliary light beams being spaced apart in a radial direction of the optical disc-shaped record medium, by a distance which corresponds to N/2 (N is a positive integer) times said track pitch on said optical disc-shaped record medium, and signal generating circuit means including means operative to obtain a first difference output corresponding to a difference in level between detection outputs derived respectively from said two parts of said first photodetecting element and a second difference output corresponding to a difference in level between detection outputs derived respectively from said two parts of said second photodetecting element, means for level adjusting one of said first and second difference outputs, and means for producing a tracking error signal based on said first and second difference outputs following said level adjusting of said one of the difference outputs.

2. An apparatus according to claim 1, wherein said means for level adjusting is applied to said second difference output.

3. An apparatus according to claim 1, wherein said light beam generating means is further operative to produce a second pair of auxiliary light beams, and said optical path forming means is operative to cause the main light beam and the first mentioned pair and said second pair of auxiliary light beams to impinge upon the optical disc-shaped record medium so that, on the optical disc-shaped record medium, a center point between said light beam spots formed by the first pair of auxiliary light beams, respectively, a center of said light beam spot formed by the main light beam and a center point between light beam spots formed by said second pair of auxiliary light beams, respectively, are aligned.

4. An apparatus according to claim 3, wherein said light beam generating means comprises a light beam source and a grating arrangement including a pair of grating members superposed on each other.

5. An apparatus according to claim 4, wherein said grating members are provided with respective grating directions which intersect each other at a predetermined angle.

6. An apparatus according to claim 3, wherein said photosensitive means further includes a third photosensing element divided into two parts, said optical path forming means is operative to guide said second pair of auxiliary light beams emanating from the optical disc-shaped record medium to said third photodetecting element, said signal generating circuit means further includes means to obtain a third difference output corresponding to a difference in level between detection outputs derived respectively from said two parts of said third photodetecting element and means for adding said second difference output to said third difference output so as to produce an added output, said means for producing the tracking error signal provides said tracking error signal as a difference in level between said first difference output and said added output, and said means for level adjusting acts on one of said first difference output and said added output.

* * * * *